(12) United States Patent
Bohlender

(10) Patent No.: US 9,058,750 B2
(45) Date of Patent: Jun. 16, 2015

(54) FLIGHT SIMULATOR VIBRATION SYSTEM

(75) Inventor: Peter Bohlender, Linsengericht (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 589 days.

(21) Appl. No.: 13/071,300

(22) Filed: Mar. 24, 2011

(65) Prior Publication Data

US 2011/0236861 A1    Sep. 29, 2011

(30) Foreign Application Priority Data

Mar. 29, 2010    (EP) ..................................... 10400020

(51) Int. Cl.
*G09B 9/12*    (2006.01)
*G09B 9/08*    (2006.01)
*G09B 9/46*    (2006.01)
*G09B 9/16*    (2006.01)

(52) U.S. Cl.
CPC . *G09B 9/46* (2013.01); *G09B 9/165* (2013.01)

(58) Field of Classification Search
USPC ................................................ 434/46, 30, 33
See application file for complete search history.

(56) References Cited

U.S. PATENT DOCUMENTS

| | | | |
|---|---|---|---|
| 2,885,792 A * | 5/1959 | Hemstreet ....................... 434/33 |
| 3,309,795 A | 3/1967 | Helmore | |
| 4,030,208 A * | 6/1977 | Carver et al. ................... 434/46 |
| 5,199,875 A * | 4/1993 | Trumbull ......................... 434/62 |
| 5,618,995 A * | 4/1997 | Otto et al. ....................... 73/669 |
| 5,857,986 A * | 1/1999 | Moriyasu ........................ 601/49 |
| 6,370,457 B1 * | 4/2002 | Nemeth .......................... 434/35 |
| 6,744,370 B1 * | 6/2004 | Sleichter et al. ............. 340/576 |
| 6,752,716 B1 * | 6/2004 | Nishimura et al. ............... 463/6 |
| 7,585,215 B1 * | 9/2009 | Kanno et al. ..................... 463/6 |
| 7,798,814 B2 * | 9/2010 | Makuta et al. .................. 434/61 |
| 2001/0008849 A1 | 7/2001 | Komata | |
| 2003/0180693 A1 * | 9/2003 | Mulder et al. .................. 434/58 |
| 2005/0168021 A1 * | 8/2005 | Real et al. .................. 297/217.3 |
| 2009/0154737 A1 | 6/2009 | Ostler | |

FOREIGN PATENT DOCUMENTS

| | | |
|---|---|---|
| EP | 0970730 A1 | 1/2000 |
| EP | 1455325 A2 | 9/2004 |

OTHER PUBLICATIONS

Search Report and Written Opinion; Application No. EP 10400020; dated Sep. 8, 2010.
W. Albery, "8. Simulation", Air Force Research Laboratory, XP0000 Albery 100202, May 2001, pp. 111-120.

* cited by examiner

*Primary Examiner* — Sam Yao
*Assistant Examiner* — Peter J Alley
(74) *Attorney, Agent, or Firm* — Brooks Kushman P.C.

(57) ABSTRACT

The invention relates to a flight simulator vibration system, particularly to a crew seat (1), a flight control stick (20) and a panel (30) vibration system of a flight simulator with at least one plate of the crew seat (1), the flight control stick (20) and/or the panel (30) being equipped with predefined momentum weights (13, 16) and electric motors driving said respective momentum weights. Speed governors are controlling individually said electric motors (7, 8, 9, 21, 33, 34).

18 Claims, 3 Drawing Sheets

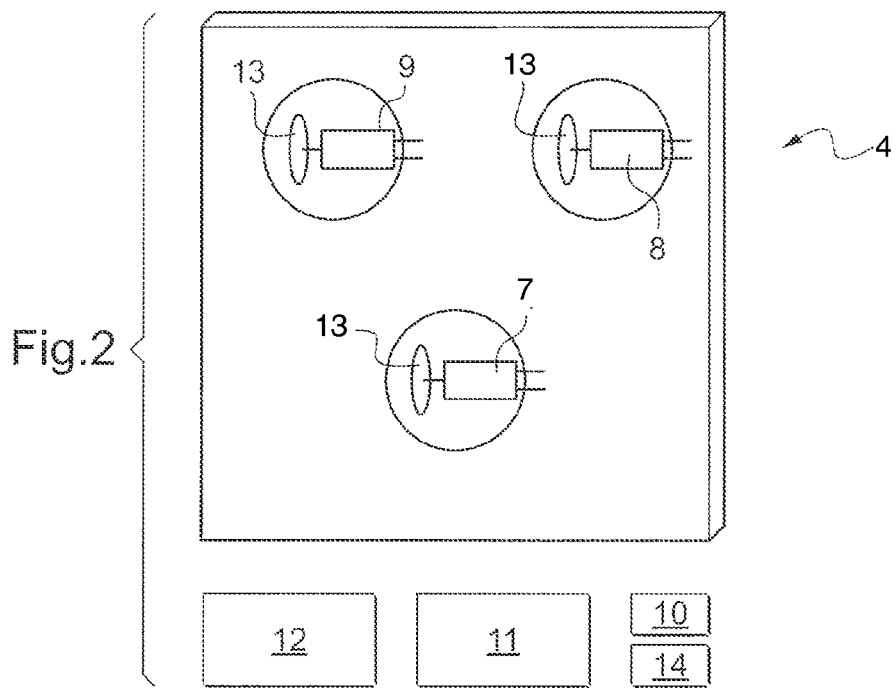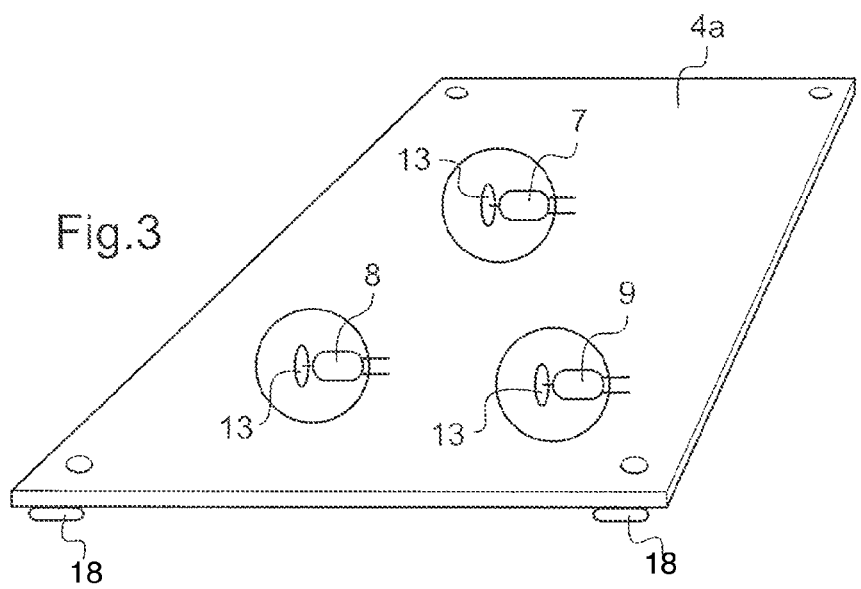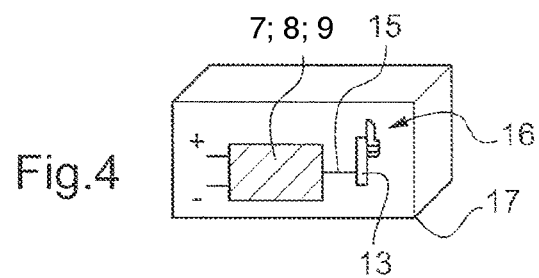

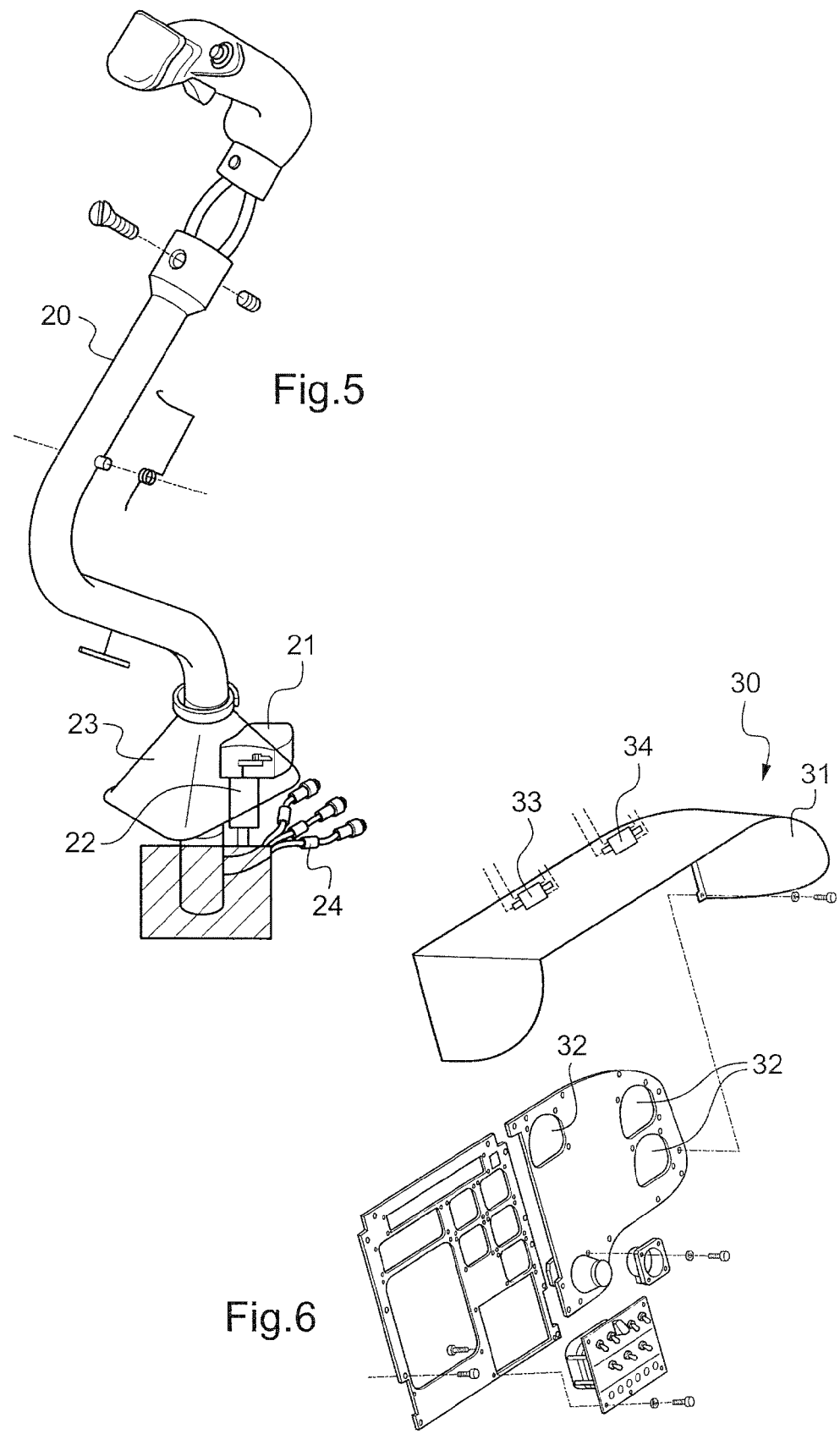

FLIGHT SIMULATOR VIBRATION SYSTEM

CROSS REFERENCE TO RELATED APPLICATIONS

This application claims the benefit of EP 10 400 020.3 filed on Mar. 29, 2010, the disclosure of which is incorporated in its entirety by reference herein.

BACKGROUND OF THE INVENTION (1) Field of the Invention

The invention relates to a flight simulator vibration system, particularly to a crew seat, a flight control stick and a panel vibration system of a flight simulator for a helicopter.

(2) Description of Related Art

The design of a low-cost simulation system to replicate helicopter/shipboard launch and recovery envelopes reduces the reliance on expensive at-sea developmental flight tests. A high-frequency, low-amplitude motion with a three degree of freedom (3DOF) seat shaker/motion system allows simulator systems integrators to provide motion and vibration cues to an operator without the expense of a full cab motion system providing pitch, roll and heave cues to the operator's seat based on the simulated vehicle's motion. Vehicle X and Y cues are also blended into the motion to provide realistic driving cues. Vibrations of 10 Hz until 40 Hz, with a preferred value of 25 to 26 Hz, depending on the vibrations simulated, can be provided to each of the three degrees of freedom. The seat motion system control electronics are packaged as a self-contained simulation node that performs the required cueing algorithms locally at a high iteration rate and can communicate with other simulation components over serial or Ethernet connections. The node receives vehicle state information from the vehicle dynamics model as well as vibration and discrete bump commands.

For flight simulation it is known to use motion simulators including 6-post motion platforms with the platform being supported by 6 active hydraulic actuators. The 6-post is essentially a hydraulic position servo driven by commanded leg or actuator lengths computed by a motion system mathematical model.

Seat shakers of the state of the art are different from the original seat and very expensive. Their control is affected via complicated software and necessitates interference with existing system components. Some of the vibrations created by the seat shakers of the state of the art are likely to deteriorate the operation of adjacent systems.

(3) Description of Related Art

U.S. 2009154737 A1 discloses an apparatus, system and method for an entertainment chair to provide a high fidelity audio system incorporated in an entertainment chair. The entertainment chair is relatively independent from an acoustical environment in which it is placed and enables repeatable high fidelity sound with a wide variety of recording types and qualities. A subwoofer is placed in the backrest and a shaker is placed in the seat bottom. The subwoofer and shaker are separately tuneable through a control panel ergonomically placed at a forward end of an arm rest. The control panel includes a universal iPod dock. Other inputs may also be connected to the entertainment chair. This system is dedicated to personal entertainment and is not suitable for any flight simulation.

SUMMARY OF THE INVENTION

It is an object of the present invention to provide a flight simulator vibration system, particularly a crew seat, a flight control stick and a panel vibration system of a flight simulator without the disadvantages of the state of the art and improving the feeling of a pilot or a crew in order to present an utmost realistic flight simulation.

The solution is provided with a flight simulator vibration system, particularly a crew seat, a flight control stick and a panel vibration system of a flight simulator, each having predefined momentum weights and electric motors driving the momentum weights. The system additionally includes at least one electronic control circuit for control of the electric motors. Preferred embodiments of the invention are provided in the sub claims below.

According to the invention a flight simulator vibration system is provided with at least one crew seat, at least one flight control stick and at least one panel vibration system comprising each predefined momentum weights and electric motors driving said respective momentum weights and at least one speed governor controlling preferably individually said electric motors. The invention provides the advantages of a complete and modular flight simulator vibration system.

According to a preferred embodiment of the invention a flight simulator crew seat comprises at least one supplemental plate integrated into the seat with predefined momentum weights and three electric motors for each plate driving said respective momentum weights. An electronic control circuit is provided particularly conceived as speed governor controlling said three electric motors in order to provide different frequencies of oscillation and orientation to the momentum weights in the direction of all three coordinate axis. It is one advantage of the present invention to provide a flight simulator crew seat vibration system improving the feeling of a pilot or a crew for an utmost realistic flight simulation. The inventive flight simulator crew seat supplies the means to avoid the so called simulator sickness. The seat of the invention is built up from an original crew seat and thus looks the same and feels the same as an original seat and provides for a genuine flight feeling and reflection of the real oscillations of an aircraft. The flight simulator crew seat of the invention may be used in a full flight simulator (FFS) after certification and approval from the authorities in charge. The inventive flight simulator crew seat can be built up from all original crew seats and without extra time consumption. Considerable savings in costs may be achieved with the inventive system as deficient systems through oscillation damages can be avoided. The inventive system is less bulky and leads to less weight than with a flight simulator crew seat according to the state of the art. The inventive system can be extended to customized solutions. According to the invention the control is driven by low voltage current in the range of up to 14 V thus avoiding any risks from the electric supply of the electro-motors to any users. According to the invention the electronic control circuit is independent without any need any to intercept into any existing systems for installation of the inventive flight simulator vibration system. Advantageously said control may be tuned according to the frequencies of sounds created in a simulation independent of any existing computer system with the frequencies of sounds created in the simulation corresponding preferably to the frequencies of a turbine, rotor or tail rotor of a helicopter.

According to a further aspect of the invention the electronic control circuit is invisibly arranged outside the seat for improved modularity and better acceptance by the clients. The inventive seat may be fully adjustable with no restrictions from the inventive system.

According to a further preferred embodiment of the invention the at least one supplemental plate is mounted to a backrest of the crew seat for transfer of its simulated vibrations directly to the back of the user in the seat.

According to a further preferred embodiment of the invention at least one further supplemental plate is mounted to a sitting support of the crew seat for transfer of its simulated vibrations directly to the legs and body of the user in the seat.

According to a further preferred embodiment of the invention each supplemental plate is provided with three electric motors each driving respectively one momentum weight for common control features of the simulated vibrations in separate plates.

According to a further preferred embodiment of the invention flexible stripes are provided being arranged across casings of the electro-motors and screwed at their respective ends to the plate for economic and versatile installation of the electro-motors allowing easy rotation of the electro-motors. The technical effect is that by turning the motor casing the force direction is adjusted.

According to a further preferred embodiment of the invention at least one control processor is provided and a DC pulse transformer as an interface to the electronic control circuit for filtering and preparation of the data for the control of the electro-motors.

According to a further preferred embodiment of the invention microphones are provided, data from the microphones are filtered by the audio-frequency splitter and converted inside the control processor in order to allow simulation of vibrations corresponding to operational sounds, such as the sound from a rotor of an operating helicopter.

According to a further preferred embodiment of the invention at least one external device is provided for transmittal of analog input data reflecting speed and/or flying position data (attitude) and/or digital input reflecting critical levels of flying position like a maximum bank angle. The analog and/or digital input goes directly to the electronic control circuit to allow integration of complex influences to the simulation of vibrations.

According to another preferred embodiment of the invention a flight control stick vibration system is provided with an electro-motor with a momentum weight mounted eccentrically inside a security casing integral with the electro-motor allowing essentially modulated simulation of vibration in the flight control stick with the features of the vibration system of the at least one crew seat.

According to another preferred embodiment of the invention a panel vibration system with at least one glare-shield is provided, said panel being provided with two electro-motors with respective momentum weights allowing reproduction of vibrations in said glare-shield with essentially the features of the vibration system of the at least one crew seat and/or the flight control stick.

According to a preferred embodiment of the invention the momentum weights are adjustable and/or can be replaced for simple and versatile adaption of the flight simulator vibration system to a wide range of different samples.

According to a preferred embodiment of the invention the electro-motors can be rotated for simple and effective tuning of the simulated vibrations. The technical effect is that it allows the force direction to change.

According to a preferred embodiment of the invention the respective momentum weights and their respective orientations are calibrated for a start sample and consequent proceedings.

According to a preferred embodiment of the invention three electronic control circuits are provided for shared processing with a back-up option and with at least one of said electronic control circuits being conceived as speed governor.

BRIEF DESCRIPTION OF THE DRAWINGS

A preferred embodiment of the invention will be described by way of the attached drawings.

FIG. 2 shows a schematic view of a part of a seat of said flight simulator vibration system according to the invention, FIG. 3 shows a schematic view of a lower plate of a seat of said flight simulator vibration system according to the invention, FIG. 4 shows a schematic view of an electro motor of said flight simulator vibration system according to the invention, FIG. 5 shows a schematic view of a flight control stick of said flight simulator vibration system according to the invention, and FIG. 6 shows a schematic view of a panel vibration system of said flight simulator vibration system according to the invention.

DETAILED DESCRIPTION OF THE PREFERRED EMBODIMENTS

Figure 1:
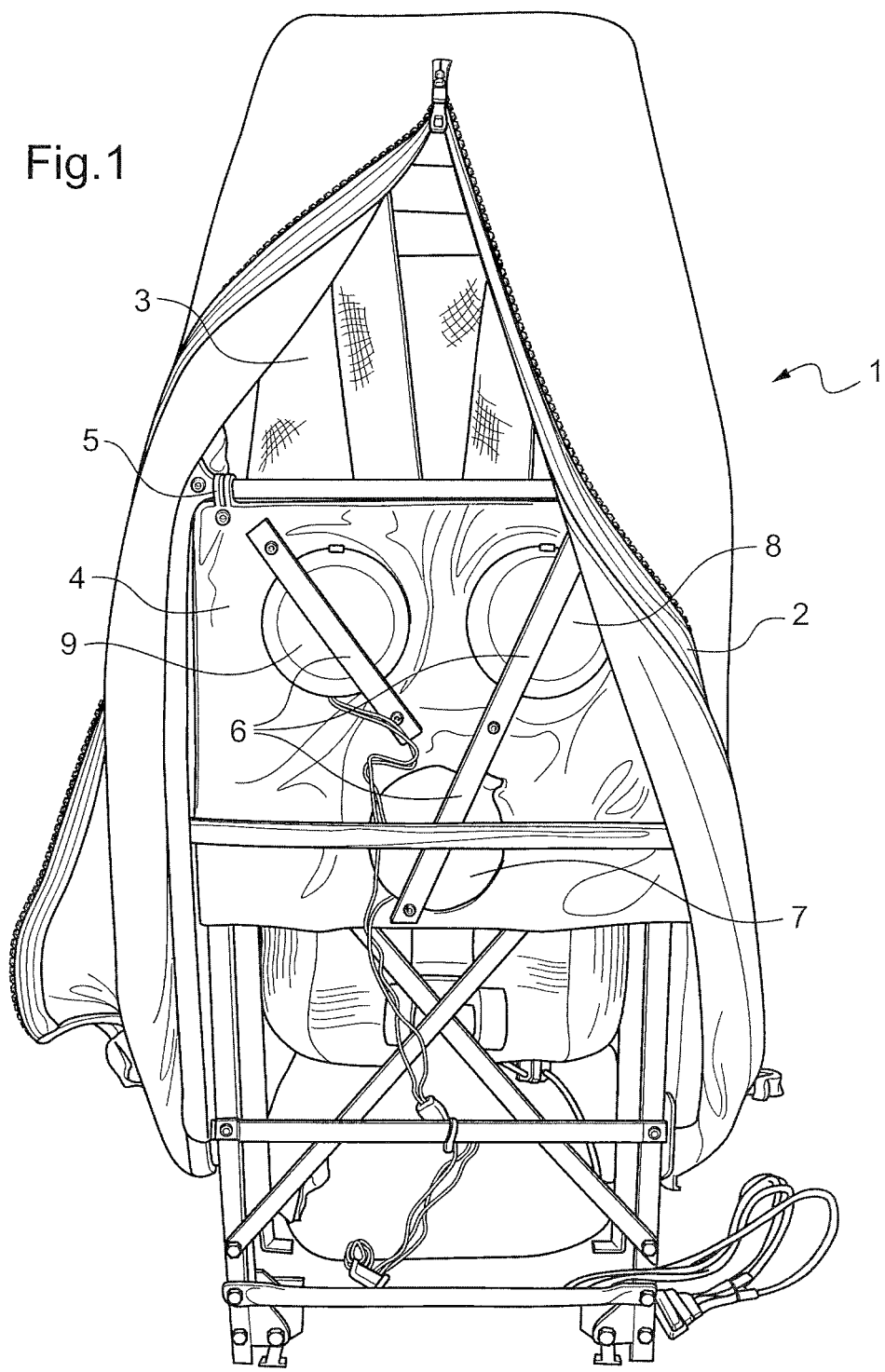
FIG. 1 shows a view from behind onto a crew seat of a flight simulator vibration system according to the invention.

FIG. 1: A flight simulator vibration system for an aircraft and particularly for a helicopter, has as a basis a fully adjustable standard crew seat 1 of a helicopter (not shown) with all the features of a genuine crew seat particularly a cover 2 that can be opened and closed via a zip along a vertical direction of the backrest 3 of this crew seat 1.

An essentially rectangular plate 4 is mounted as a supplemental essentially parallel to the backrest 3 of this crew seat 1. The plate 4 is made of aluminium with a 3-4 mm thickness and is fixed to a frame of the backrest 3 of crew seat 1 by way of screws and clamps 5.

Three independent, flexible stripes 6 are arranged across casings of electro-motors 7, 8, 9 and are screwed at their respective ends to the plate 4 to hold down the three casings of the electro-motors 7, 8, 9 against the plate 4. The three electro-motors 7, 8, 9 are mounted to the plate 4 from the side opposed to the pilot's back. Two electro-motors 8, 9 are mounted to an upper part of the plate 4 and one electro-motor 7 is mounted to a lower part of the plate 4 with the electro-motors 7, 8, 9 having about the same distances between each other. Each of the flexible stripes 6 can be loosened individually by unscrewing at least one of their respective ends allowing the electro-motors 7, 8, 9 to be rotated individually in the plane of the plate 4 and relative to each other. This allows the force direction to be adjusted.

FIG. 2, 3, 4: Corresponding features are numbered with the same references as in FIG. 1. Flight operation data may be processed for genuine flight simulations. Audio data with real flight manoeuvre sound track may be recorded by microphones 10 transmitting frequencies to a control processor 11 for the electro-motors 7, 8, 9. The frequencies from the microphones input 10 are filtered and processed in the control processor 11 via a DC pulse transformer (not shown) to control parameters, i.e. by partitioning the supply voltage for the respective electro-motors 7, 8, 9. The control processor 11 is linked via a sub D interface to an electronic control circuit 12 and from there via shielded cables to the electro-motors 7, 8, 9. Analog input with data of speed and/or flying position and digital input with data of speed limits and/or critical levels of flying position like a maximum bank angle may be fed directly to the electronic control circuit 12 from an external device 14. The electronic control circuit 12 is conceived as speed governor for the electro-motors 7, 8, 9. The electric power supply for the electro-motors 7, 8, 9 is based on 12-14 Volt transformed from the generally available 220 V (in the USA 110 V).

An essentially rectangular lower plate 4a is integrated as a supplemental seat shaker into a sitting support of a flight simulator crew seat 1. The lower plate 4a as well as electro-motors and the assembly of the lower plate 4a with the electro-motors correspond principally to the essentially rectangular plate 4 mounted as a supplement to the backrest 3 of this crew seat 1 of the flight simulator vibration system. The control and supply of the electro-motors of the lower plate 4a corresponds to the control and supply of the electro-motors 7, 8, 9 of the plate 4 at the backrest 3 of the crew seat 1. Rubber dampers 18 are provided at each of the corners of the lower plate 4a for attenuating the impact of the vibrations from the lower plate 4a to the crew seat 1 of the flight simulator vibration system.

The electro-motors 7, 8, 9 can be tuned individually up to 3000 RPM depending from the input from the electronic control circuits 12. Each of the electro-motors 7, 8, 9 comprises a power shaft 15 to which a momentum weight 13 is mounted eccentrically inside a security casing 17 integral with the electro-motors 7, 8, 9. The momentum weights 13 are rotating masses between 0.4 g to 400 g individually orientated to provide for different frequencies and orientations of the vibrations. Eccentricity of the respective momentum weights 13 may be adjustable by extra momentum weights 16 (s. FIG. 4) that can be displaced radially with regard to the axis of the power shaft 15. The security casing 17 is provided with an access to allow replacement and/or adjustment of the momentum weights 13, 16. The orientation of the momentum weights 13, 16 can be tuned by rotating the electro-motors 7, 8, 9 individually or relative to each other under the loosened stripes 6 parallel to the plane of the plate 4. At least one of a pair of adjacent electro-motors 7, 8, 9 is rotating anti-clockwise while the other one is rotating clockwise.

The respective momentum weights 13, 16 and their respective orientations are first calibrated to correspond best to measurements of an operating aircraft to be simulated (not shown). For this end the amplitudes and frequencies of vibrations during operation of an aircraft are measured and registered and the registered data are transferred to the crew seat 1 of the flight simulator vibration system. The speed controllers 12 may be adapted to the registered measures to tune the rotational speed of the electro-motors 7, 8, 9 till the amplitudes and frequencies of the vibrations at the crew seat 1 of the flight simulator vibration system correspond to the registered measures. A profile from a plurality of registered measures can be created and stored in a memory to provide simulation of ongoing flight operations to the electro-motors. A helicopter main rotor at approximately 390 RPM and with 4 blades provides vibrations at frequencies of approximately 25/26 Hz. Thus for such a case vibrations resulting from the frequencies at 25/26 Hz have to be simulated in the crew seat 1.

FIG. 5: Corresponding features are numbered with the same references as in FIGS. 1 to 4. A flight control stick 20 of a flight simulator vibration system is provided with an electro-motor 21 with a momentum weight mounted eccentrically inside an integral security casing alike any of the electro-motors 7, 8, 9. A clamp 22 around the electro-motor 21 with the security casing is screwed to the flight control stick 20 next to the joints 23 linking the flight control stick 20 to the flight simulator vibration system.

The electro-motor 21 is connected to the electric power supply via a power cable and to the electronic control circuit 12 via shielded cables 24.

FIG. 6: Corresponding features are numbered with the same references as in FIGS. 1 to 5. A panel 30 of a flight simulator vibration system is equipped with a glare-shield 31, such glare-shield 31 being supposed to avoid blinding of the instruments 32 by sunshine and thus obstructing the pilot's view in flight operation. The panel 30 is provided with two electro-motors 33, 34 with respective momentum weights allowing reproduction of vibrations of 4 Rev in the glare-shield corresponding to vibrations during genuine flight operation at a speed of ~17 and 24 kts. The electro-motors 33, 34 of the panel 30 are alike any of the electro-motors 7, 8, 9 and are controlled by the electronic control circuits 12 for the crew seat 1 of the flight simulator vibration system.

What is claimed is:

1. A flight simulator vibration system for an aircraft, the system defining three coordinate axes, the system comprising:
    a crew seat with a first predefined momentum weight driven by a first electric motor, a second predefined momentum weight driven by a second electric motor, and a third predefined momentum weight driven by a third electric motor, each respective electric motor being disposed within a respective motor casing removably retained by a respective flexible stripe,
    a flight control stick with a fourth momentum weight driven by a fourth electric motor,
    a panel vibration system with a fifth momentum weight driven by a fifth electric motor, and
    at least one electronic control circuit configured to individually control the electric motors to provide vibrations about all three coordinate axes, wherein when the respective flexible stripes are removed the respective motors may be rotated for tuning and the respective momentum weights may be adjusted or replaced for tuning.

2. The flight simulator vibration system according to claim 1, wherein at least one supplemental plate is provided, the plate being provided with the first, second, and third electric motors, the at least one supplemental plate being mounted to the crew seat.

3. The flight simulator vibration system according to claim 2, wherein a second supplemental plate is mounted to a backrest of the crew seat.

4. The flight simulator vibration system according to claim 2, wherein at least one further supplemental plate is mounted to a sitting support of the crew seat.

5. The flight simulator vibration system according to claim 4, wherein the at least one further supplemental plate is provided with three electric motors, each driving respectively one momentum weight.

6. The flight simulator vibration system according to claim 1, wherein at least one control processor is provided and a DC pulse transformer as an interface to the at least one electronic control circuit for control of any of the electric motors.

7. The flight simulator vibration system according to claim 6, wherein microphones are provided and data from the microphones are filtered by the control processor, and wherein the at least one control circuit controls the electric motors to produce vibrations in response to the data.

8. The flight simulator vibration system according to claim 1, wherein at least one external device is provided for transmittal of analog input and/or digital input directly to the at least one electronic control circuit.

9. The flight simulator vibration system according to claim 1, wherein the fourth momentum weight is mounted eccentrically inside a security casing integral with the fourth electric motor.

10. The flight simulator vibration system according to claim 1, wherein at least one glare-shield is provided, the glare-shield being provided with two electric motors with respective momentum weights allowing reproduction of vibrations in the glare-shield.

11. The flight simulator vibration system according to claim 1, wherein the respective momentum weights and their respective orientations are calibrated.

12. The flight simulator vibration system according to claim 1, wherein three electronic control circuits are provided with at least one of the electronic control circuits being conceived as speed governor.

13. An aircraft flight simulator system comprising:
- a crew seat having a first electric motor drivingly coupled to a first momentum weight, a second electric motor drivingly coupled to a second momentum weight, and a third electric motor drivingly coupled to a third momentum weight, wherein the first electric motor is disposed within a first housing removably retained by a first flexible stripe, the second electric motor is disposed within a second housing removably retained by a second flexible stripe, and the third electric motor is disposed within a third housing removably retained by a third flexible stripe, the first, second and third housings being rotatable relative to the frame when the respective flexible stripes are removed and fixed relative to the crew seat when the flexible stripes are not removed;
- a flight control stick pivotally coupled with the crew seat and having a fourth electric motor drivingly coupled to a fourth momentum weight to generate vibration in the flight control stick;
- a control panel coupled with the crew seat and having a fifth electric motor drivingly coupled to a fifth momentum weight to generate vibration in the control panel; and
- a control circuit configured to selectively control the electric motors individually to generate vibration along three coordinate axes.

14. The aircraft flight simulator system of claim 13, further comprising a control processor in communication with the control circuit, wherein the control circuit is configured to control the electric motor to produce vibrations corresponding with audio data processed by the control processor.

15. The aircraft flight simulator system of claim 13, further comprising a glare shield coupled with the control panel and a sixth electric motor drivingly coupled with a sixth momentum weight and coupled with the control panel to generate vibration in the glare shield.

16. The aircraft flight simulator system of claim 13, wherein the crew seat has a lower plate, a backrest, a first plurality of momentum weights coupled with the backrest, and a second plurality of momentum weights coupled with the lower plate, wherein the first momentum weight, second momentum weight, and third momentum weight are among the first plurality of momentum weights.

17. A flight simulator vibration system comprising:
- a crew seat having a first momentum weight driven by a first electric motor, a second momentum weight driven by a second electric motor, and a third momentum weight driven by a third electric motor, wherein the first motor is disposed within a first housing removably retained by a first flexible stripe, the second electric motor is disposed within a second housing removably retained by a second flexible stripe, and the third electric motor is disposed within a third housing removably retained by a third flexible stripe, the first, second and third housings being rotatable relative to the crew seat when the respective flexible stripes are removed and fixed relative to the crew seat when the respective flexible stripes are not removed;
- a flight control stick;
- a control panel; and
- a control circuit individually controlling the first, second, and third electric motors to generate vibration in the crew seat along first, second, and third coordinate axes.

18. The flight simulator vibration system of claim 17, wherein the first motor is oriented to drive the first momentum weight about the first axis, the second motor is oriented to drive the second momentum weight about the second axis, and the third motor is oriented to drive the third momentum weight about the third axis.

* * * * *